(12) United States Patent
Atwater et al.

(10) Patent No.: US 7,011,908 B1
(45) Date of Patent: Mar. 14, 2006

(54) MANGANESE, BISMUTH MIXED METAL OXIDE CATHODE FOR RECHARGEABLE LITHIUM ELECTROCHEMICAL SYSTEMS

(75) Inventors: Terrill B. Atwater, North Plainfield, NJ (US); Alvin J. Salkind, Princeton, NJ (US); Arek Suszko, Lakewood, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 107 days.

(21) Appl. No.: 10/684,063

(22) Filed: Oct. 8, 2003

(51) Int. Cl.
*H01M 4/50* (2006.01)

(52) U.S. Cl. .................. 429/224; 429/218.1; 429/232; 252/518.1; 252/519.13; 423/599; 423/594.7

(58) Field of Classification Search ............... 429/224, 429/218.1; 252/518.1, 519.13; 423/599, 423/594.7
See application file for complete search history.

(56) References Cited

OTHER PUBLICATIONS

Atwater et al. "Thermodynamic and kinetic study of the Li/MnO2 Bi2O3 electrochemical couple". Journal of the Electrochemical Society, vol. 145, No. 3, Mar. 1998, pp. L31-L33.*

Atwater et al. "Electrochemical properties of the Li/MnO2 Bi2O3 couple", Proceedings of the Power Sources Conference (1998), 38th.*

* cited by examiner

*Primary Examiner*—Laura Weiner
(74) *Attorney, Agent, or Firm*—Michael Zelenka; George B. Tereschuk

(57) ABSTRACT

The present invention provides a manganese bismuth mixed metal oxide cathode material through a solid-state reaction between manganese dioxide, and either bismuth or a bismuth compound in a compound having the general formula $MnO_y(Bi_2O_3)_x$, which affords charge transfer catalytic behavior that allows the cathode to be fully reversible at suppressed charge potentials and increased discharge potentials. The $MnO_y(Bi_2O_3)_x$ cathode material may be incorporated into an electrochemical cell with either a lithium metal or lithium ion anode and an organic electrolyte. The present invention provides a compound with the general formula $MnO_y(Bi_2O_3)_x$, where subscript x is between 0.05 and 0.25, subscript y is about 2 and the overcharge protection is not needed as the subscript z approaches 0.0. In the preferred embodiment, a cathode material where subscript x is between 0.05 and 0.135 with the formula $MnO_2(Bi_2O_3)_{0.12}$ provides the much-needed full reversibility, high voltage stability and reduced charge transfer impedance. A manganese bismuth mixed metal oxide cathode for an lithium electrochemical system, a lithium electrochemical system and a rechargeable lithium battery employing the same compound with the general formula $MnO_y(Bi_2O_3)_x$ and methods for making manganese bismuth mixed metal oxide cathode material for lithium electrochemical devices having the general formula $MnO_y(Bi_2O_3)_x$ are also provided.

5 Claims, 5 Drawing Sheets

MANGANESE, BISMUTH MIXED METAL OXIDE CATHODE FOR RECHARGEABLE LITHIUM ELECTROCHEMICAL SYSTEMS

GOVERNMENT INTEREST

The invention described herein may be manufactured, used, imported, sold, and licensed by or for the Government of the United States of America without the payment to me of any royalty thereon.

FIELD OF THE INVENTION

This invention relates in general to the field of electrochemical power sources and in particular to rechargeable lithium batteries and rechargeable lithium-ion batteries using a manganese bismuth metal oxide or mixed metal oxide as the positive electrode or cathode.

BACKGROUND OF THE INVENTION

Portable batteries with increased energy and power densities are required as the use of portable electronic equipment rapidly continues to increase. Batteries are typically the limiting factor in the performance of most portable commercial and military electronic equipment due to the restrictions on the size, weight and configuration imposed on the equipment by limitations from the power source. In some cases, safety and environmental factors are also significant considerations for deploying a particular power source. Lithium batteries provide high energy density, conformal packaging and improved safety, which make them one of the most promising electrochemical systems under development today.

Lithium batteries use high valence metal oxide materials, which are reduced during the electrochemical reaction. This reaction in rechargeable lithium and rechargeable lithium ion batteries must be fully reversible in order to have a viable cell. Common reversible metal oxide materials used in lithium batteries include: $Li_xMn_2O_4$, $Li_xCoO_2$ and $Li_x$-$NiO_2$. These materials remain reversible against lithium whenever the lithium subscript "x" is maintained between 0.15 and 0.90 for $Li_xMn_2O_4$ and 0.4 and 0.95 for $Li_xCoO_2$ and $Li_xNiO_2$. However, if the stoichiometry exceeds these limitations, the material undergoes a phase change and is no longer reversible. The primary consequences of this phase change of the material and subsequent irreversibility are that the cell will no longer accept a charge, which makes the cell inoperable. In order to maintain this stoichiometry rigid electronic control in employed, but rigid controls such as current and voltage limiters employed at the stack level and are often not practical for many situations where lithium batteries are deployed, which makes maintaining reversibility even more critical for those lithium electrochemical systems used in portable electronic devices and apparatus.

Thus there has been a long-felt need to solve the problems associated with maintaining reversibility in lithium batteries without suffering from the disadvantages, limitations and shortcomings associated with rigid stoichiometry electronic control and phase change. It has been found that a mixed metal oxide that introduces bismuth into the manganese dioxide cathode structure yields a material with high voltage stability and a reduced charge transfer impedance due to catalytic activity. This reduced charge transfer impedance provides a lower potential charge mechanism avoiding the problems associated with loss of reversibility in lithium batteries without suffering from the disadvantages, limitations and shortcomings associated with rigid stoichiometry electronic control and phase change.

SUMMARY OF THE INVENTION

It is an object of the present invention to provide a manganese bismuth mixed metal oxide cathode material as the positive electrode in rechargeable lithium and lithium ion electrochemical cells.

Another object of the present invention is to provide a manganese bismuth mixed metal oxide cathode material having the general formula $MnO_y(Bi_2O_3)_x$ as the positive electrode in rechargeable lithium and lithium ion electrochemical cells.

It is still a further object of the present invention is to provide a manganese bismuth mixed metal oxide cathode material having the general formula $MnO_y(Bi_2O_3)_x$ as the active positive electrode where subscript x is between 0.05 and 0.25 and subscript y is about 2.

It is yet another object of the present invention is to provide a manganese bismuth mixed metal oxide cathode material having the formula $MnO_2(Bi_2O_3)_{0.12}$ as the positive electrode in rechargeable lithium and lithium ion electrochemical cells.

It has now been found that these and the aforementioned objects can now be advantageously attained by reacting metallic bismuth or a compound containing bismuth with $MnO_2$. Manganese based mixed metal oxides with bismuth were initially examined as a cathode material for rechargeable lithium and lithium-ion batteries in order to provide a new mixed metal oxide cathode material as the positive electrode in rechargeable lithium and lithium ion electrochemical cells. A stable mixed metal oxide was fabricated through a solid-state reaction between manganese dioxide, and bismuth or a bismuth compound. The electrochemical reaction is:

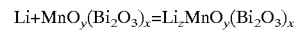

$$Li+MnO_y(Bi_2O_3)_x=Li_zMnO_y(Bi_2O_3)_x$$

which is reversible when the lithium subscript "z" in this reaction is between 0.0 and 0.50. Further, overcharge protection is not required due to the stability of the material as the lithium subscript z approaches 0.0. In preferred embodiments, subscript x is between 0.05 and 0.135. It is anticipated that the $MnO_y(Bi_2O_3)_x$ materials, cathodes and cells of the present invention will also provide inexpensive and less costly lithium and lithium ion electrochemical cells, without suffering from the disadvantages, shortcomings and limitations of prior art devices. The devices and methods of the present invention provided much improved sustained specific capacity of about 120 mAhrs/g, and the material exhibited an inherent catalytic behavior for charge transfer.

The present invention also encompasses a single step method for making manganese bismuth mixed metal oxide cathode material for lithium electrochemical devices having the general formula $MnO_y(Bi_2O_3)_x$ as the active positive electrode where subscript x is between 0.05 and 0.25 and subscript y is about 2. The single-step method for making a cathode material for a lithium electrochemical system, comprises forming a mixture by mixing the manganese oxide and bismuth metal or bismuth oxide. The mixture is then heat treated in an annealing oven.

DETAILED DESCRIPTION OF THE DRAWINGS

Figure 1:
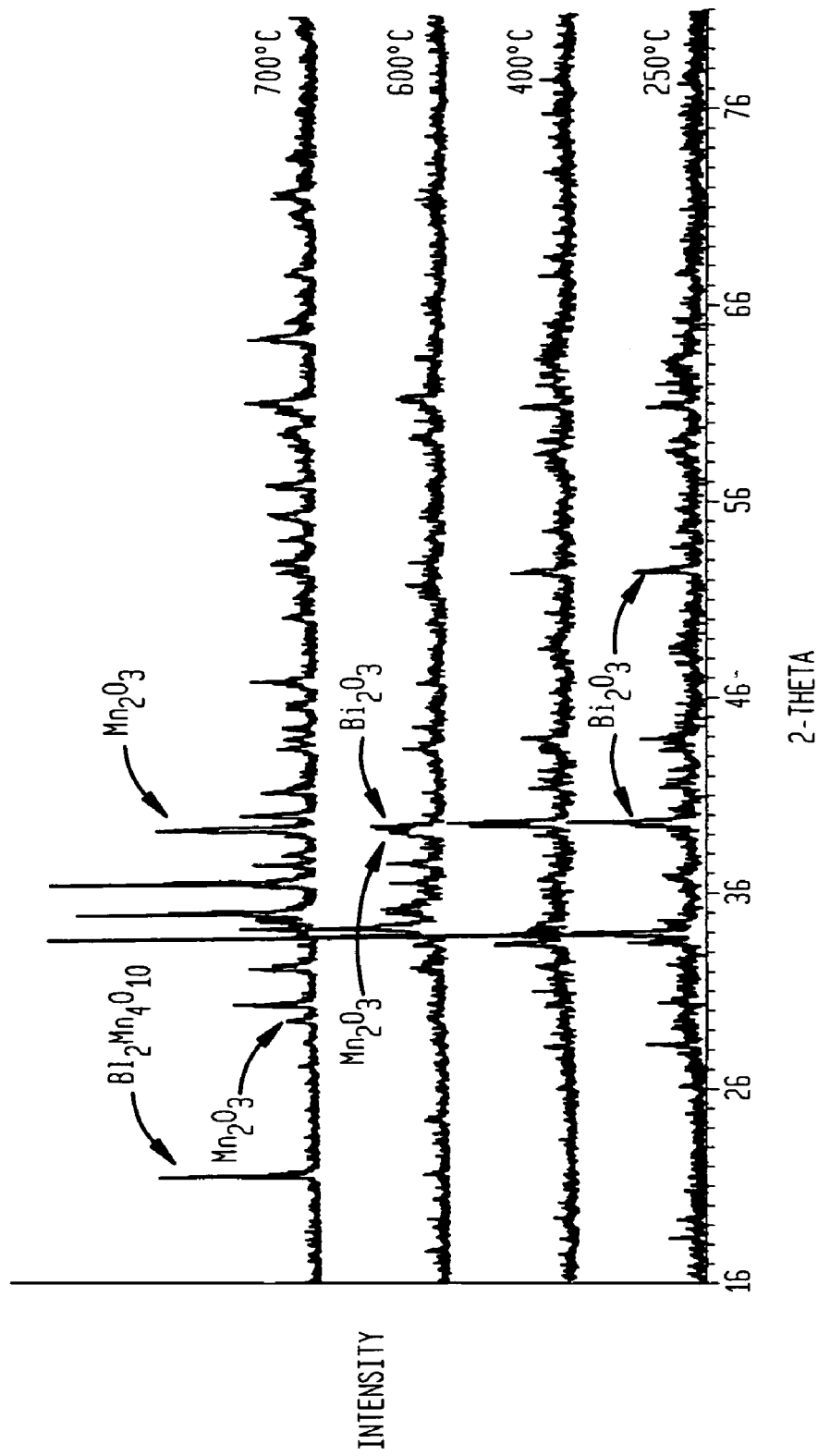
FIG. 1 depicts spectra of $MnO_2(Bi_2O_3)_{0.06}$ after heat treatment showing the formation of unwanted $Bi_2Mn_4O_{10}$ and the decomposition product $Mn_2O_3$.

The manganese bismuth mixed metal oxide material of the present invention advantageously provides cathode materials answering long-felt needs for a fully reversible lithium battery without suffering from any of the drawbacks, limitations and disadvantages of prior art phase changing batteries. In order to resolve the reversibility problem, electrochemical measurements were performed on rechargeable lithium batteries using a manganese, bismuth mixed metal oxide as the positive electrode. Initial efforts concentrated on a primary $Li/Bi_xMnO_2$ system, which showed an increased operating voltage when compared to $Li/\beta MnO_2$. These measurements identified an increased discharge potential for the $Li/Li_xMnO_2(Bi_2O_3)_y$ electrochemical couple and suppressed charge potentials for the $Li/Li_xMnO_2(Bi_2O_3)_y$ compound. Changes in cell behavior as a function of bismuth stoichiometry in $MnO_2$, as well as cell discharge and charge properties with respect to the bismuth stoichiometry, were also measured. Preliminary results indicated that $MnO_y(Bi_2O_3)_x$ electrochemical cells would produce the required reversibility and still meet other necessary lithium battery operational objectives, without suffering from the setbacks, limitations and disadvantages associated with prior art lithium batteries. Subsequent efforts have yielded an improved solid-state reaction process for rechargeable $Li/MnO_y(Bi_2O_3)_x$ systems. The mixed metal oxide materials, cathodes and cells showed a reversible couple between lithium and the mixed metal oxide.

The present invention provides a manganese bismuth mixed metal oxide cathode material through a solid-state reaction between manganese dioxide, and either bismuth or a bismuth compound in a compound having the general formula $MnO_y(Bi_2O_3)_x$. This $MnO_y(Bi_2O_3)_x$ compound affords charge transfer catalytic behavior that allows the cathode to be fully reversible at suppressed charge potentials and increased discharge potentials. The $MnO_y(Bi_2O_3)_x$ cathode material of the present invention is incorporated into an electrochemical cell with either a lithium metal or lithium ion anode and an organic electrolyte. In all embodiments, the cathode of the present invention comprises a compound with the general formula $MnO_y(Bi_2O_3)_x$, where subscript x is between 0.05 and 0.25, preferably between 0.05 and 0.135, subscript y is about 2 and the overcharge protection is not needed as the subscript z approaches 0.0 in this reaction:

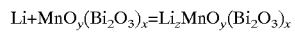

which provides charge transfer catalytic behavior allowing the cathode to be fully reversible. In the preferred embodiment, a cathode material where subscript x is between 0.05 and 0.135 with the formula $MnO_2(Bi_2O_3)_{0.12}$ provides the much-needed full reversibility, high voltage stability and reduced charge transfer impedance. The materials, cathodes and cells of this invention answer the long-felt need for a reversible cathode for rechargeable lithium batteries without suffering from the shortcomings, limitations and disadvantages of rigid stoichiometry electronic control, phase change and loss of reversibility.

Referring now to the drawings, FIG. 1 shows the X-ray diffraction spectra for $MnO_2(Bi_2O_3)_{0.06}$ after heat treatment. The starting material for this process is $Bi(OH)_3$ precipitated on $MnO_2$. The data show the formation of unwanted $Bi_2Mn_4O_{10}$ and the decomposition product $Mn_2O_3$. Decomposition of $MnO_2$ is initiated at 400° C. and the formation of $Bi_2Mn_4O_{10}$ is initiated at 600° C.

Figure 2:
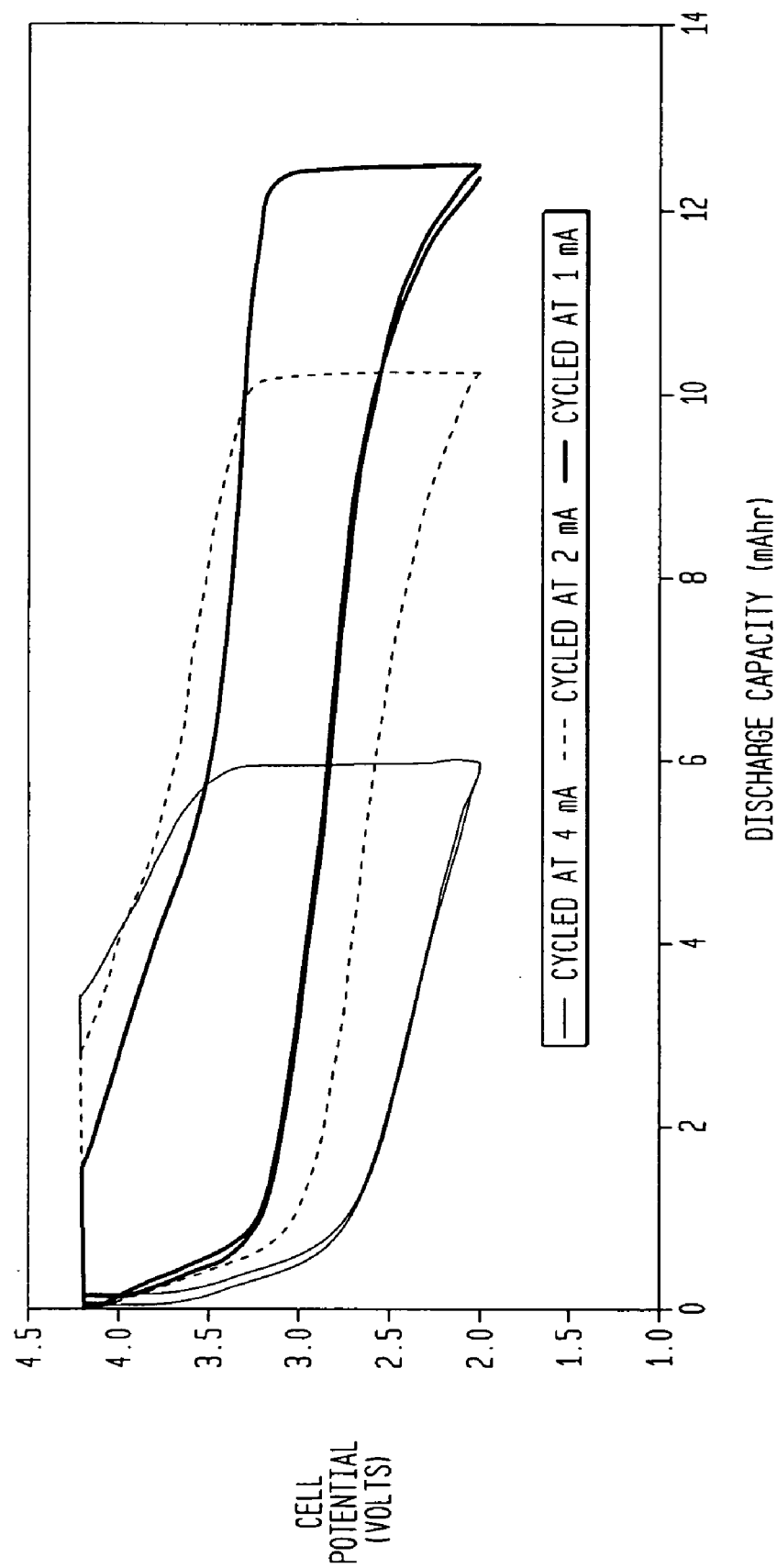
FIG. 2 is a chart illustrating comparative discharge curves the typical cyclic profile for lithium-bismuth manganese mixed metal oxide electrochemical button cell.

FIG. 2 is a chart showing comparative discharge curves for a single $Li/Bi_{0.27}MnO_2$ cell. The data show the capacity achieved when the cell is subjected to a charge discharged cycle of 4.0, 2.0 and 1.0 mA, respectively. These discharge curves show the second and third full cycle for each current with 4.0 mA represented by the thin line, 2.0 mA represented by the broken line and 1.0 mA represented by the bold line. The high coulombic efficiency for this couple, 99 percent for these cycles, is displayed clearly in the data presented in FIG. 2. The data also show reasonable rate capability for this non-rate optimized cell design. The cell components are not under compression and have a long electrode-to-electrode distance.

Figure 3:
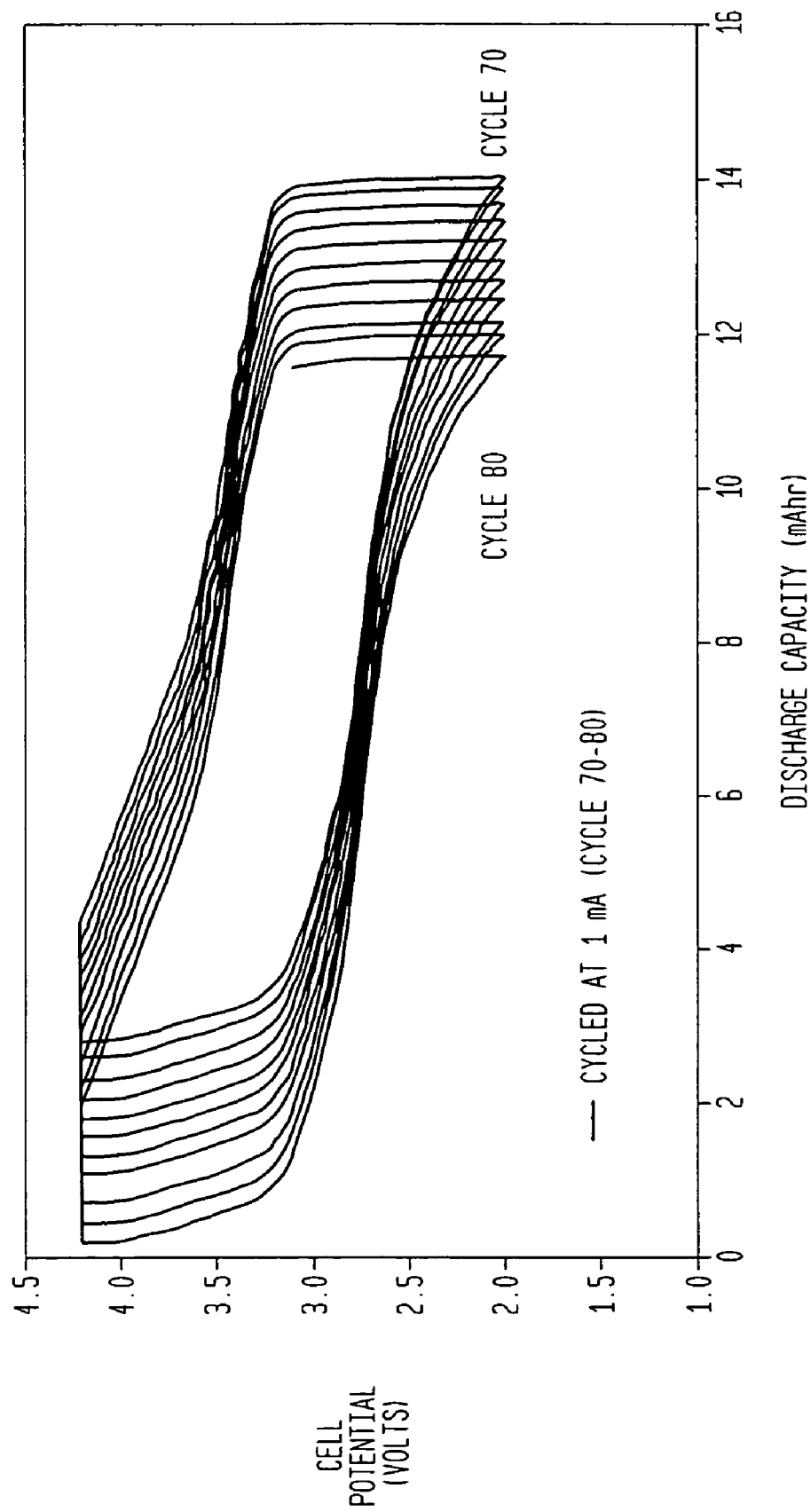
FIG. 3 is a chart illustrating the typical cyclic profile for lithium-bismuth manganese mixed metal oxide electrochemical button cell.

FIG. 3 is a chart showing the 70$^{th}$ through 80$^{th}$ charge and discharged cycles discharge for a $Li/MnO_2(Bi_2O_3)_{0.12}$ cell. This plot is typical for this electrochemical couple. As with the FIG. 2 chart, the FIG. 3 data show the high coulombic efficiency for this electrochemical couple. Data showing the high charge rate capability of the lithium-bismuth manganese mixed metal oxide electrochemical couple is plotted in FIG. 4.

Figure 4:
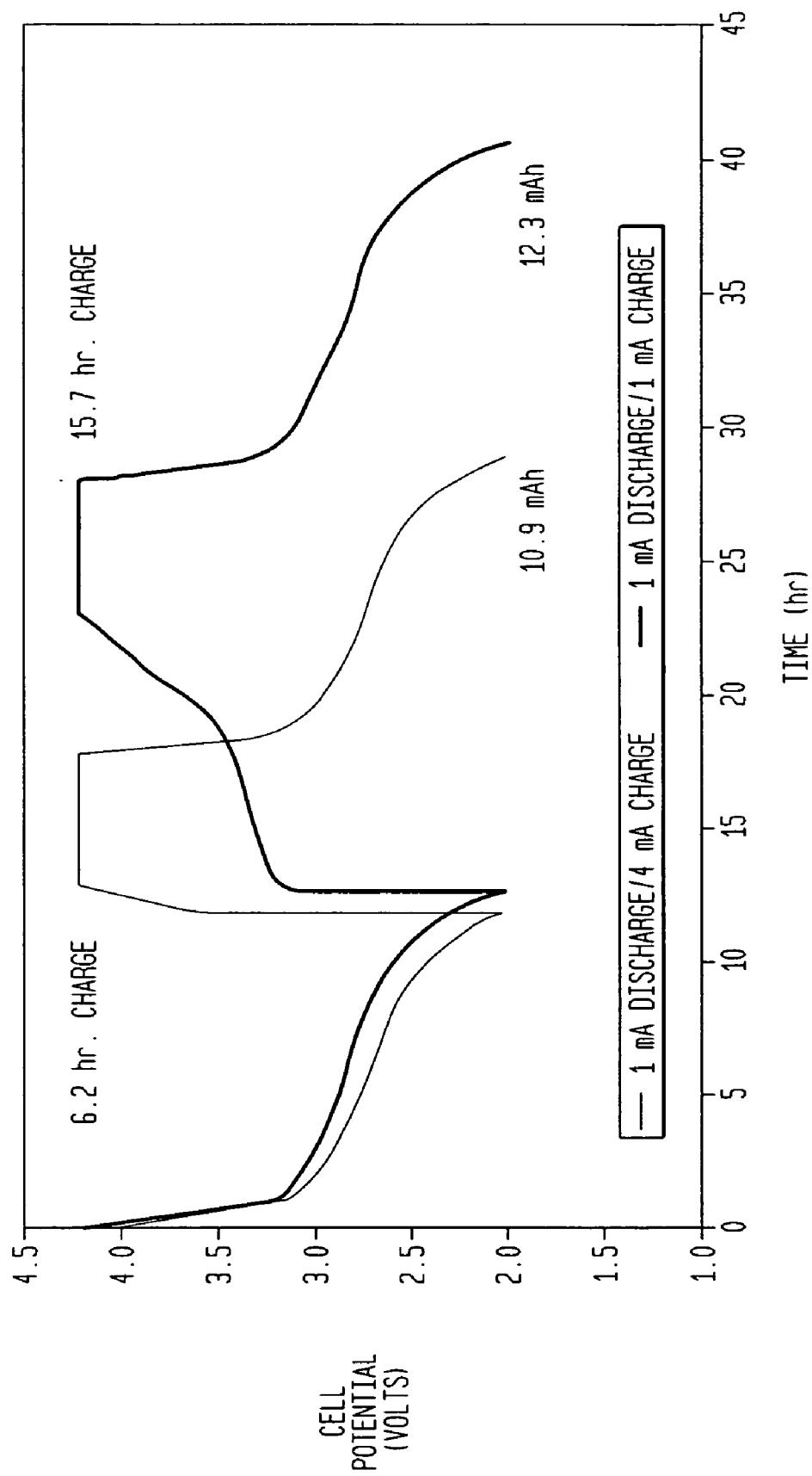
FIG. 4 is a chart illustrating comparative high charge rate capability of the lithium-bismuth manganese mixed metal oxide electrochemical couple.

FIG. 4 is a chart showing the high charge rate capability of the lithium-bismuth manganese mixed metal oxide electrochemical couple. FIG. 4 depicts comparative high charge rate curves of a 1 mA discharge with a 4 mA charge for 6.72 hours, which is represented by the thin line, and a 1 mA discharge with a 1 mA charge for 15.7 hours, which is represented by the bold line.

These charts and drawings clearly show that a stable manganese, bismuth mixed metal oxide can be fabricated for use as a rechargeable lithium battery cathode. The initial specific capacity of the $Li/MnO_2(Bi_2O_3)_{0.12}$ cathode material was found to be 150 mAhr/g. This capacity was maintained with 2/3 of the initial discharge capacity through 100 cycles. Additionally, the system exhibited a coulombic efficiency greater than 97 percent and a 95 percent energy efficient charge. A number of other variations are also possible, including the manganese, bismuth mixed metal oxide resulting from a solid-state reaction between manganese dioxide and bismuth the cathode material, providing a sustained specific capacity of about 120 mAhrs/g, the subscript x being between 0.05 and 0.135 and the compound being fully reversible. The compound could be $MnO_2(Bi_2O_3)_{0.12}$. Also, the cathode material can be placed in a rechargeable system or a lithium ion electrochemical system. The cathode material can maintain the initial specific capacity with 2/3 of an initial discharge capacity through 100 cycles, provide a coulombic efficiency greater than 97 percent and a 95 percent energy efficient charge. The cathode material can be produced from this solid-state reaction:

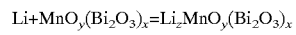

where the subscript z approaches 0.0, an overcharge protection is avoided and a charge transfer catalytic behavior is provided that allows the cathode material to be fully reversible. The cathode material can also be produced from a solid-state reaction between manganese dioxide, and a bismuth compound.

Figure 5:
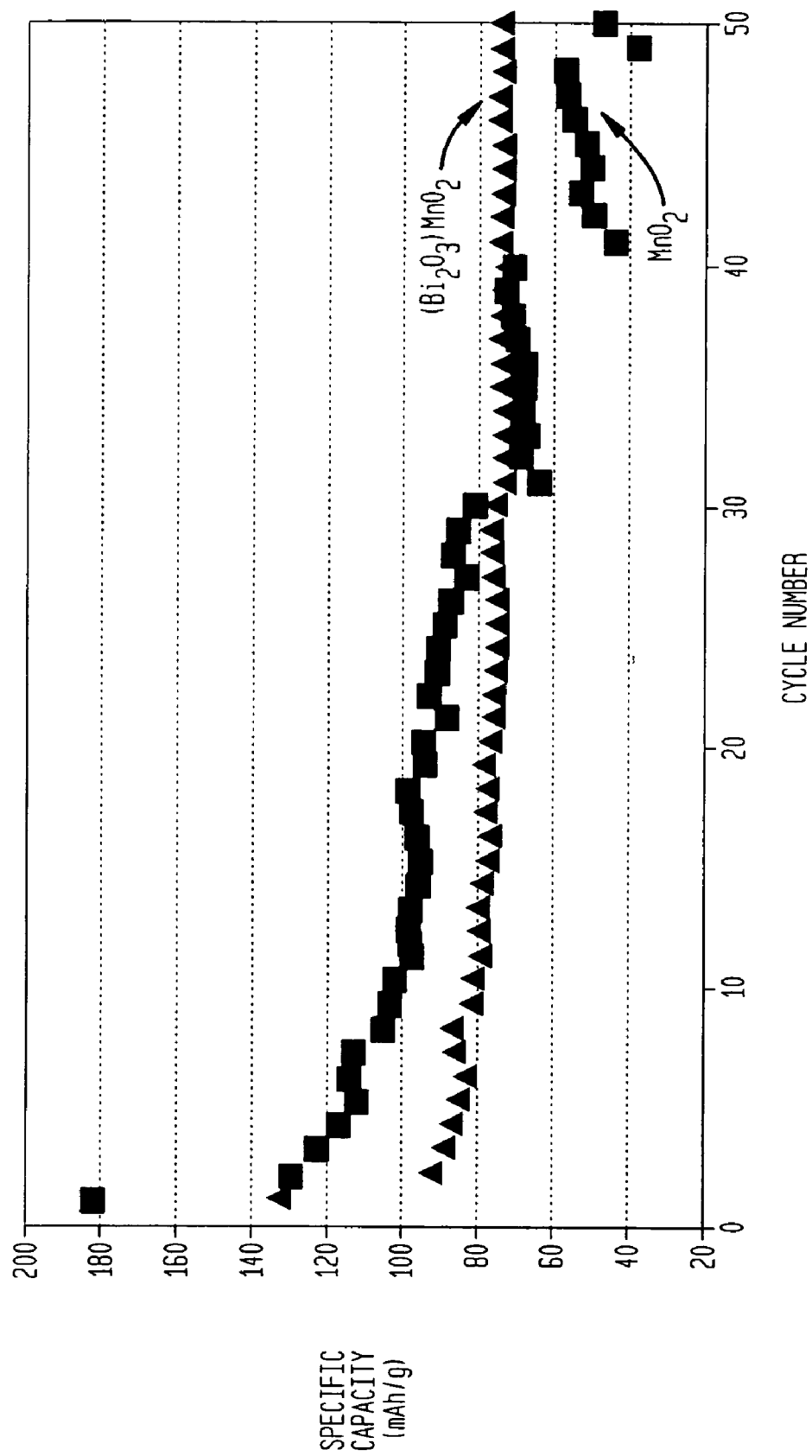
FIG. 5 is a chart showing specific capacity and number of cycles of a $MnO_2(Bi_2O_3)$ compound of the present invention.

FIG. 5 is a chart showing specific capacity and number of cycles of a $MnO_2$ $(Bi_2O_3)$ compound of the present invention; compared to current state of the art rechargeable $MnO_2$. The data shows despite a lower initial capacity the capacity of $MnO_2$ $(Bi_2O_3)$ compound of the present invention maintains a greater capacity as compared to current state of the art $MnO_2$ over 50 cycles.

In addition to cathode material for a lithium electrochemical system embodiment, the present invention also contemplates other embodiments, which include a manganese bismuth mixed metal oxide cathode for a lithium electrochemical system, a lithium electrochemical system with a metal oxide cathode and a rechargeable lithium battery. Many of the variations to the cathode material embodiment also apply to these embodiments.

The $Bi_xMnO_2$ material is prepared through a series of solid-state reactions. Bismuth is introduced into the $MnO_2$ matrix by mixing $Bi_2O_3$, $Bi(OH)_3$ or Bi metal with $MnO_2$ and heating in a furnace at least 72 hours. After heat treatment the materials were characterized with X-ray diffraction.

Laboratory button cells were fabricated in order to evaluate the electrochemical properties of the lithium/manganese, bismuth mixed metal oxide electrochemical system. The experimental cells were composed of a lithium anode separated from a Teflon bonded cathode with a non-woven glass separator. The cathode was fabricated by combining $MnO_y$ $(Bi_2O_3)_x$, carbon and Teflon in a 87:9:4 weight percent, respectively. The cathode mix was rolled to 0.04 cm and dried in a vacuum oven. The cathode and 0.075 cm thick lithium foil was cut using a 1.75 cm diameter (2.48 $cm^2$) hole punch. A 0.01 cm non-woven glass was used for the separator and as a wick. The electrolyte used was 1 M $LiPF_6$ in proportional mixtures of dimethyl carbonate and ethylene carbonate.

The cells were cycled with an ARBIN Model BT-2043 Battery Test System. A two-step charge profile was used. The charge profile consisted of a constant current charged at 1.0, 2.0 and 4.0 mA to 4.2 volts followed by an applied constant voltage of 4.2 volts. The constant voltage was maintained for 5 hours or until the charge current dropped to 0.1 mA. The cells were discharged at 1.0, 2.0 and 4 mA to 2.0 volts. A rest period of 15 minutes between charge and discharge cycles allowed for the cells to equilibrate.

Prior to cycling cell impedance is recorded with a Solartron, SI1260 Frequency Response Analyzer with a Solartron, SI1287 Electrochemical Interface using Scribner Associates, Inc., ZPlot and ZView software. The data is used as a quality control tool and for comparative use between variant chemistries.

The present invention encompasses a method of making a manganese mixed metal oxide cathode for a lithium electrochemical system, comprising the steps of selecting a bismuth compound from the group of bismuth compounds consisting of $Bi_2O_3$, $Bi(OH)_3$ and Bi metal, mixing the bismuth compound with $MnO_2$, heating the mixture in an annealing oven between 400° C. and 600° C. for at least 72 hours, forming a positive, active manganese bismuth mixed metal oxide compound having the general formula $MnO_y$ $(Bi_2O_3)_x$, where subscript x is greater than 0.05 and less than 0.25 and subscript y is about 2.0, drying the compound, forming a cathode by mixing the compound with a conductive carbon and a binder, inserting the cathode into the lithium electrochemical system, providing a reduced charge transfer impedance due to a catalytic reaction causing the cathode to prevent an overcharge and a phase change and the compound remaining reversible against a lithium compound in the lithium electrochemical system. Additionally, the variations that apply to other embodiments of this invention also apply to this method.

It is to be understood that although active starting material with a stoichiometry of $Bi_{0.24}MnO_2$ was used to demonstrate the viability of this material, other stoichiometries of $MnO_y$ $(Bi_2O_3)_x$ could be used to optimize the cell performance. It should also be understood that the sequence of heat treatments achieving the $MnO_y$ $(Bi_2O_3)_x$ active material was used to demonstrate the viability of this material, other sequences of $MnO_y$ $(Bi_2O_3)_x$ fabrication could be used to optimize the cell performance. Additionally other metal oxides used for lithium batteries could show improved performance by being reacted with bismuth.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements and dimensions can achieve the results described herein, without departing from the spirit and scope of this invention. Accordingly, the present invention should not be limited by the foregoing description, but only by the appended claims.

We claim:

1. A method of making a manganese mixed metal oxide cathode, comprising the steps of:
   selecting a bismuth compound from the group of bismuth compounds consisting of $Bi_2O_3$, $Bi(OH)_3$ or Bi metal;
   mixing said bismuth compound with $MnO_2$;
   heating said mixture in an annealing oven between 400° C. and 600° C. for at least 72 hours;
   forming a positive, active manganese bismuth mixed metal oxide compound having the general formula $MnO_y$ $(Bi_2O_3)_x$, where said subscript x is greater than 0.05 and less than 0.25 and said subscript y is about 2.0;
   drying said compound; and
   forming said cathode by mixing said compound with a conductive carbon and a binder.

2. The method of making the manganese mixed metal oxide cathode, as recited in claim 1, further comprising the step of combining said compound, said carbon and said binder in a 87:9:4 weight percent.

3. The method of making the manganese mixed metal oxide cathode, as recited in claim 2, wherein said compound results from a solid-state reaction between manganese dioxide; and said bismuth compound.

4. The method of making the manganese mixed metal oxide cathode, as recited in claim 3, wherein said subscript x is greater than 0.05 and less than 0.135.

5. The method of making the manganese mixed metal oxide cathode, as recited in claim 4, wherein said compound is $MnO_2$ $(Bi_2O_3)_{0.12}$.

* * * * *